E. W. BROWN.
ELECTRIC MOTOR.
APPLICATION FILED DEC. 1, 1911.
1,034,069.
Patented July 30, 1912.
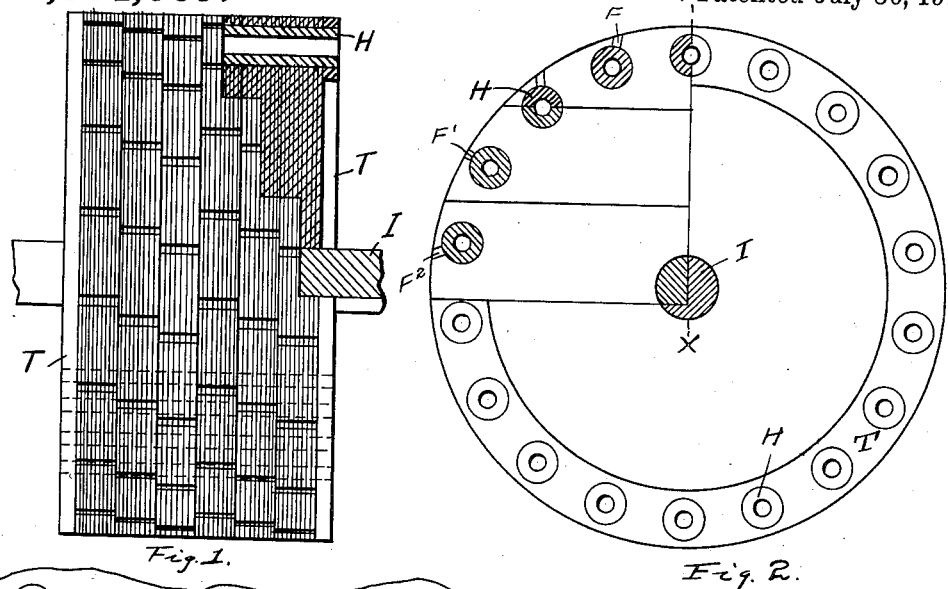
Fig. 1.   Fig. 2.
Fig. 3.
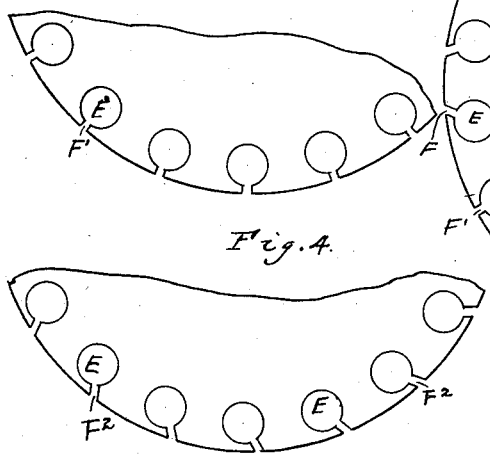
Fig. 4.
Fig. 5.
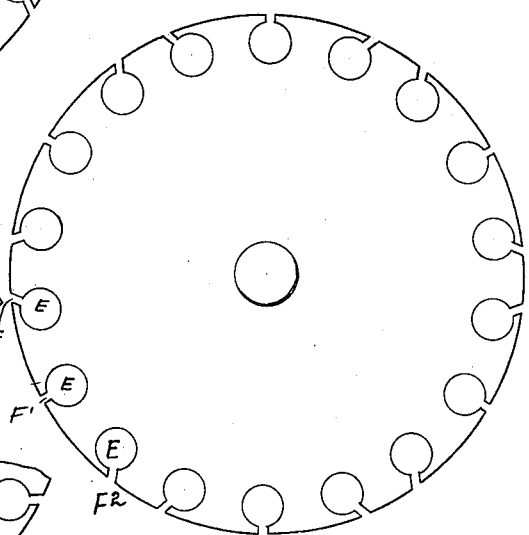
Fig. 6.
WITNESSES:
Edgar W. Brown
INVENTOR.
BY
his ATTORNEY.

UNITED STATES PATENT OFFICE

EDGAR W. BROWN, OF DAYTON, OHIO.

ELECTRIC MOTOR.

1,034,069.    Specification of Letters Patent.    Patented July 30, 1912.

Application filed December 1, 1911. Serial No. 663,346.

*To all whom it may concern:*

Be it known that I, EDGAR W. BROWN, a citizen of the United States, residing at Dayton, in the county of Montgomery and State of Ohio, have invented certain new and useful Improvements in Electric Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in electric motors and more particularly to improvements in the construction of a certain type of armature adapted to be used in alternating current motors, and has for its object, the increasing of the efficiency of the motor and the overcoming of certain faults hereinafter defined. The type of armature referred to, is the well known squirrel-cage armature, made of laminations, embedded in which are traverse conductors which have their ends electrically connected with each other. Narrow slots or openings extend from said traverse conductors to the clearance space between the armature and the field, the purpose of these slots being to compel the magnetic flux from the field to pass around the said traverse conductors. As these slots lie parallel with the teeth which form the poles of the field, they abruptly shear the magnetic flux extending from said field causing a jerky uneven torque which is especially noticeable in starting. It also causes a humming or screeching noise which is very undesirable where a quiet running motor is required. I am aware that certain means have been used for overcoming these faults, such for instance as is shown in a patent issued to myself on July 17, 1900 (No. 653,906) wherein the poles of the field are slanted with reference to the traverse conductors of the armature and the slots opening therefrom. While this arrangement makes a motor with a smoother torque and has less humming noise owing to the fact that the magnetism from the field is sheared gradually, it is open to the objection that as the slant of the poles of the field in relation to the traverse conductors of the armature is increased, the efficiency of the motor is decreased.

In the present invention, not only is the undesirable humming noise eliminated and the torque made even but there is a decided increased efficiency shown in the motor. This result is obtained by leaving the teeth forming the poles of the field parallel with the traverse conductors of the armature and making the slots extending from said traverse conductors in such a manner that on the surface of the armature adjacent the field said slots are staggered in relation both to the teeth forming the poles of the field and the said traverse conductors of the armature.

The manner of construction is more fully shown in the drawings in which—

Figure 1 is a side view of an armature embodying the principles of my invention. A portion is shown in section on the line X—X after Fig. 2. Fig. 2 is an end view of same looking in the direction followed by the shaft, portions being cut away to expose laminations of three groups. Figs. 3—4—5 are views of portions of three kinds of laminations used in the construction of this armature. Fig. 6 represents a single lamination in which the variations of the slots are shown.

In the description and drawings similar reference characters indicate corresponding parts.

E indicates the openings through which short-circuiting conducting bars H are inserted.

F—F'—F² indicate slots which extend from the said openings E to the peripheries of the laminations. In Fig. 4 it will be noticed that the slots F' are radial with the center of the lamination. In Fig. 3 the slots F are slanted at an angle in reference to the radius of the lamination. In Fig. 5 the slots F² are also slanted at an angle in reference to the radius, but at the reverse angle to the slots shown in Fig. 3.

In constructing the armature shown in Figs. 1 and 2 it will be noticed that the laminations are mounted in groups—each group containing an equal number of laminations. First, a group of laminations similar to Fig. 3 is mounted on the shaft 1, followed by a group similar to those shown in Fig. 4, and then a group similar to those of Fig. 5. This process is repeated until the armature attains the required size. In mounting these different groups of laminations on the shaft, the openings E for the reception of the traverse conductors are kept in line. The variation in angles of the slots of the different groups of laminations causes the staggered effect on the surface or periphery of the armature which is shown in Fig. 1. It is not essential that any particular number of groups of laminations be used in the construction of this armature, neither is it essential that the variations in the angle of the slots be confined to any particular number of variations. The metallic rings or conductors T at the ends of the armature electrically connect the traverse bars H, by short-circuiting the same. Being of tubular form they afford means for conveniently balancing the armature, which may be done by placing the desired quantity of solder or its equivalent in the proper tubes until a well balanced armature is obtained.

Having described my invention, I claim:

1. In an induction motor, a rotatable member composed of a plurality of groups of laminations provided with openings, conductors mounted in said openings and electrically connected with each other by short-circuiting their ends, each group of said laminations having slots extending from said conductors to the periphery of said rotatable member, the slots of one group extending at a different angle from the slots of any adjacent group.

2. In an induction motor, a rotatable member composed of laminations provided with openings for the insertion of conductors, conductors mounted in said openings and electrically connected with each other by short-circuiting their ends, said laminations having slots extending from the periphery of said rotatable member to said conductors, the slots in one portion of said laminations extending to a conductor at a different angle from the slots of other portions of laminations to said conductor.

In testimony whereof I affix my signature, in presence of two witnesses.

EDGAR W. BROWN.

Witnesses:
R. J. McCarty,
Matthew Siebler.